Oct. 23, 1934.  M. PARIDON  1,978,057
MACHINE FOR MAKING BOX TRAYS
Filed June 10, 1933   14 Sheets-Sheet 1

Oct. 23, 1934.　　　　M. PARIDON　　　　1,978,057
MACHINE FOR MAKING BOX TRAYS
Filed June 10, 1933　　14 Sheets-Sheet 3

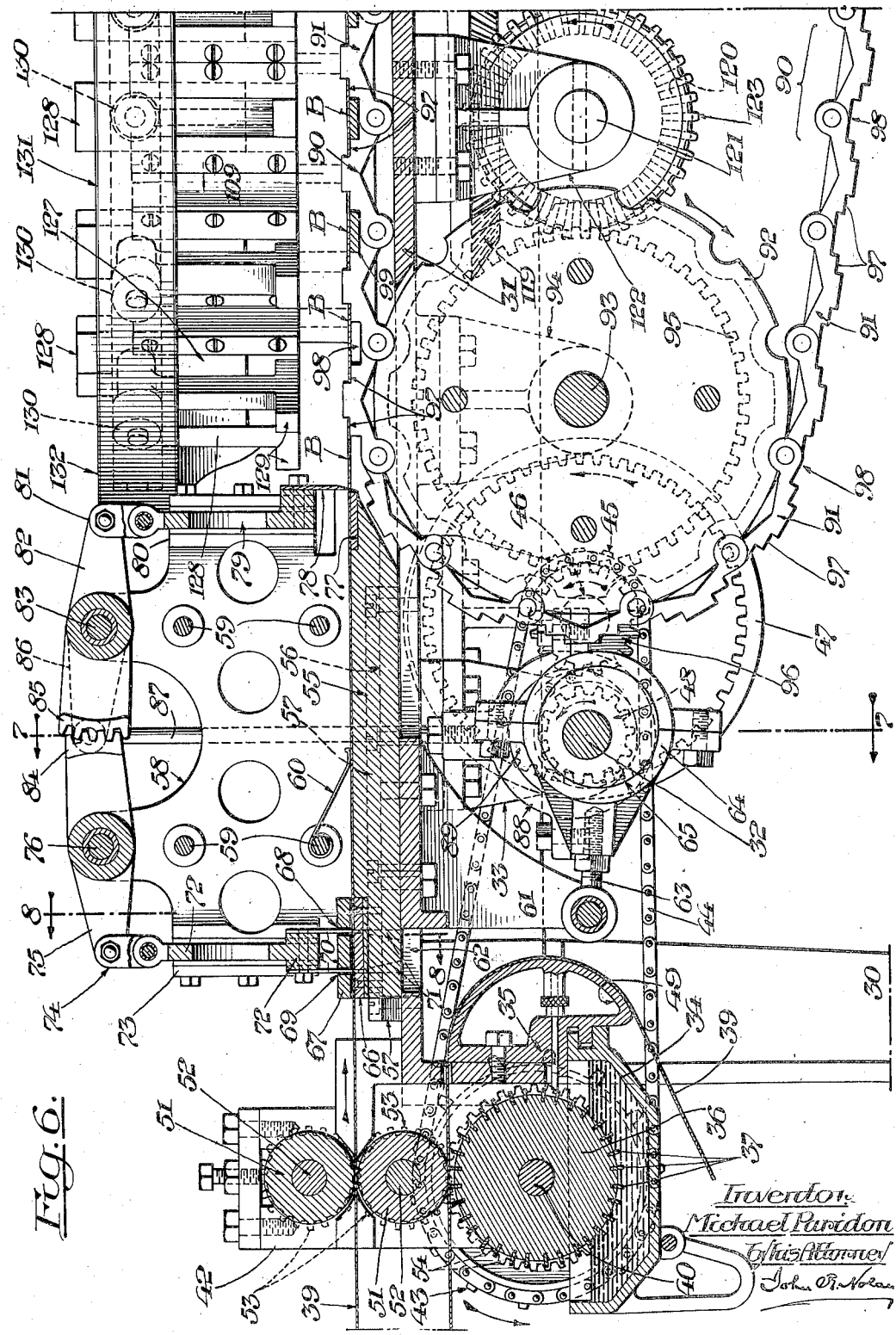

Oct. 23, 1934.  M. PARIDON  1,978,057
MACHINE FOR MAKING BOX TRAYS
Filed June 10, 1933  14 Sheets-Sheet 7
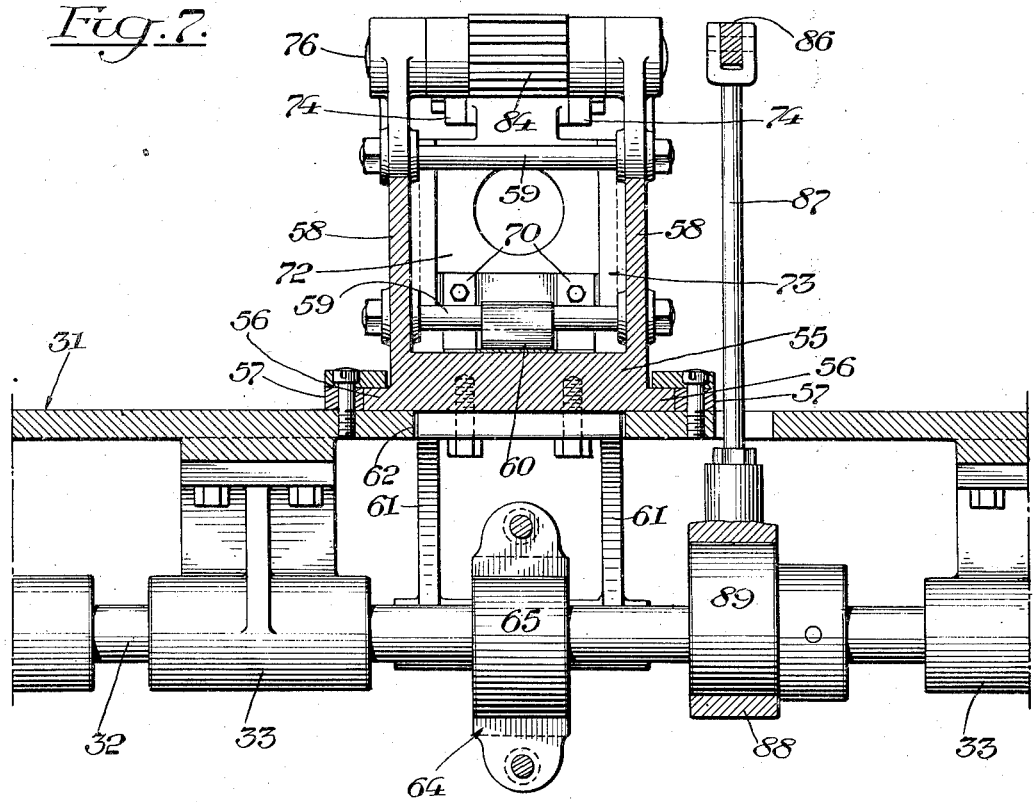
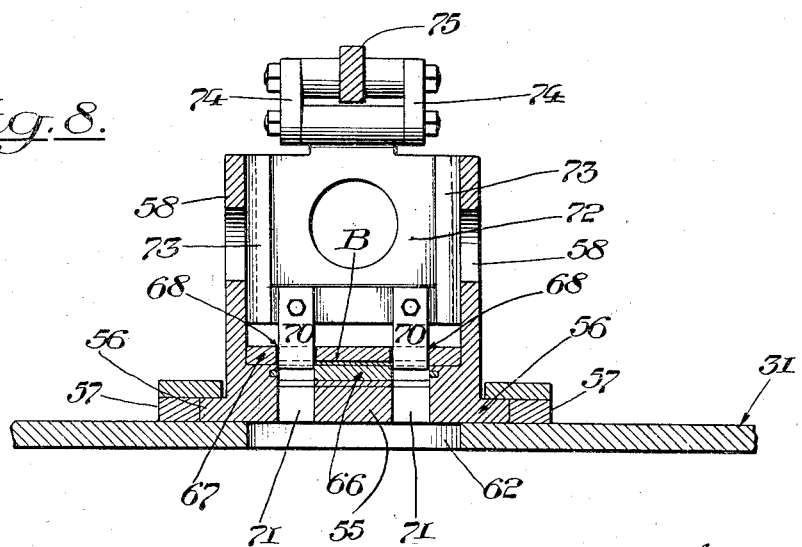

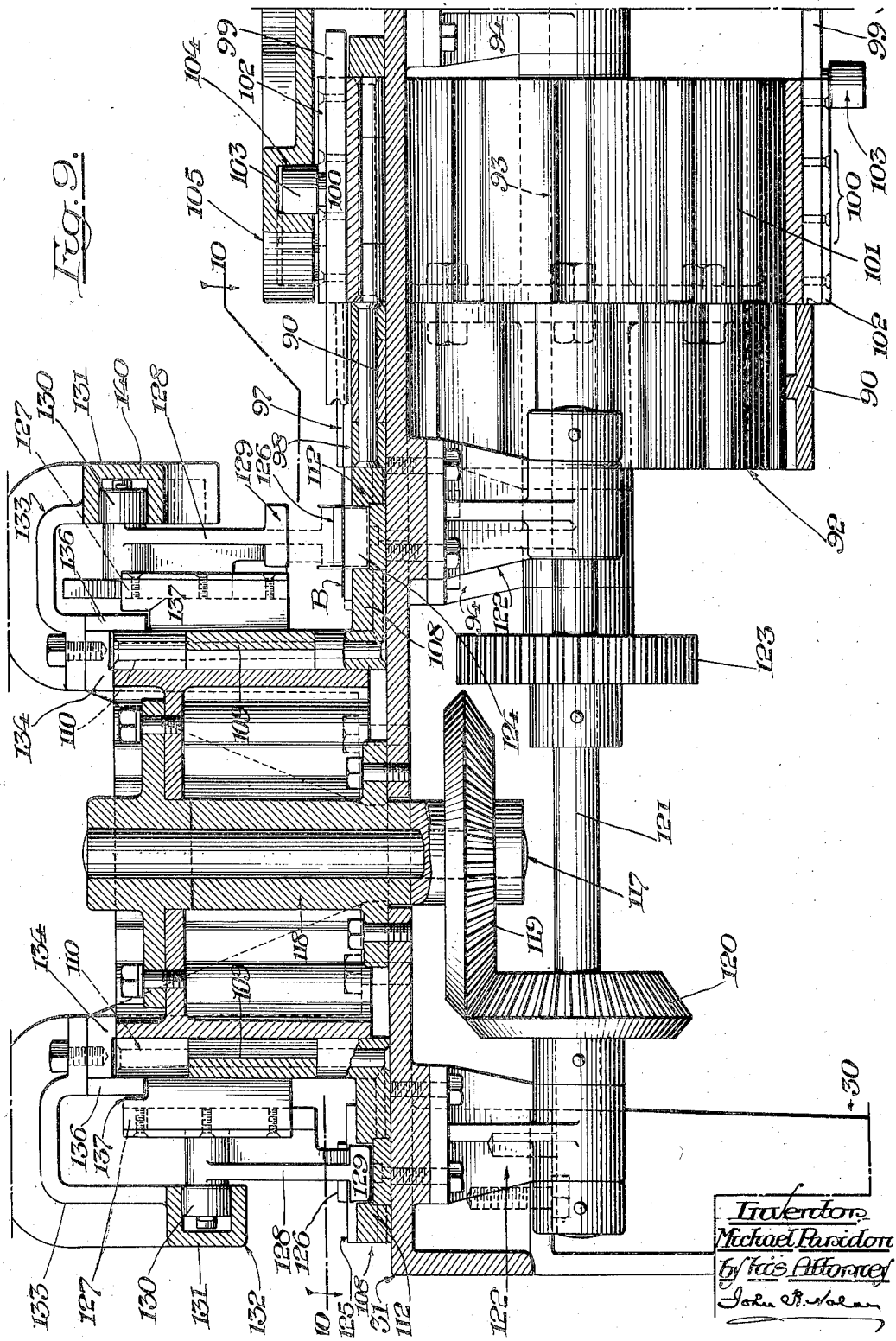

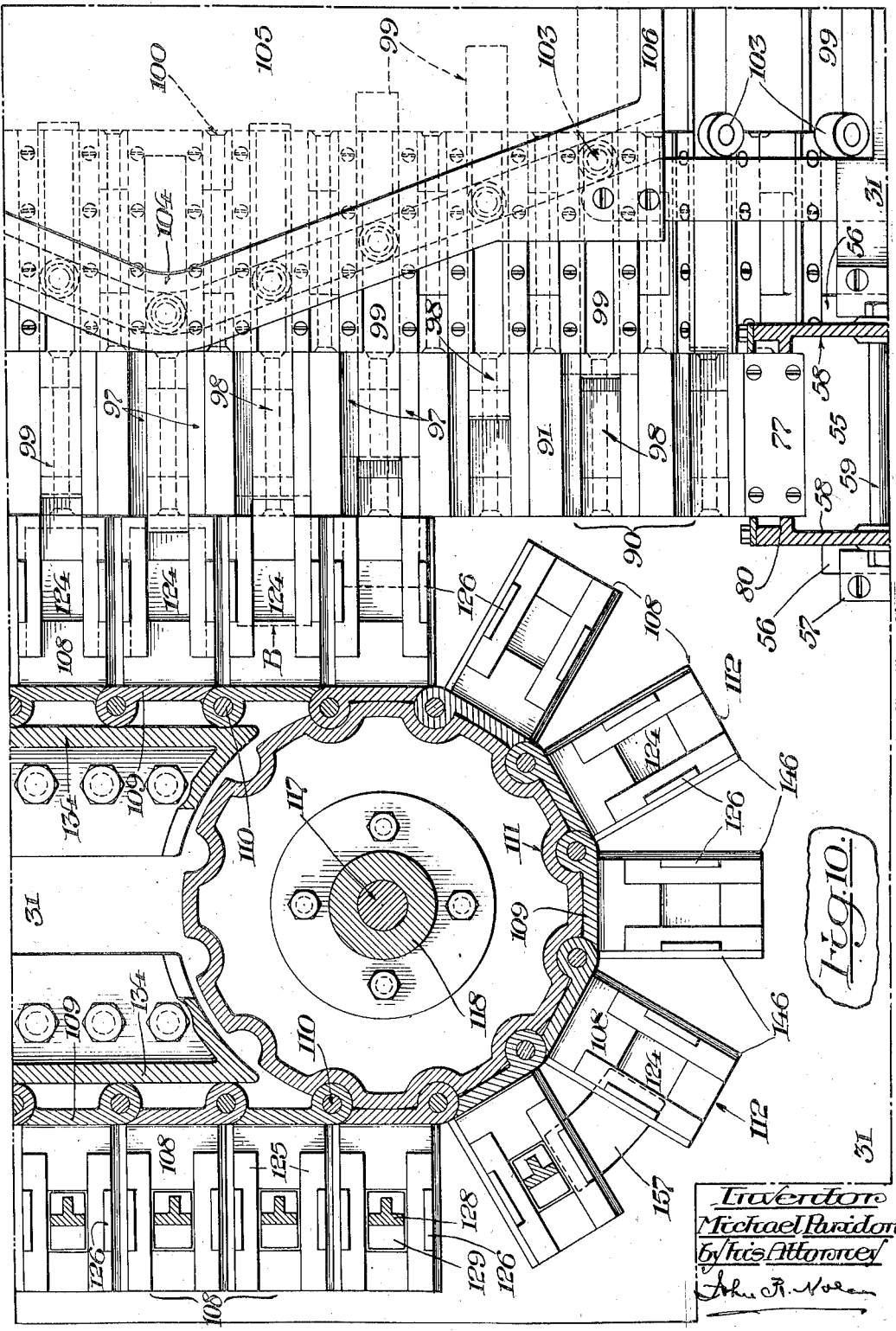

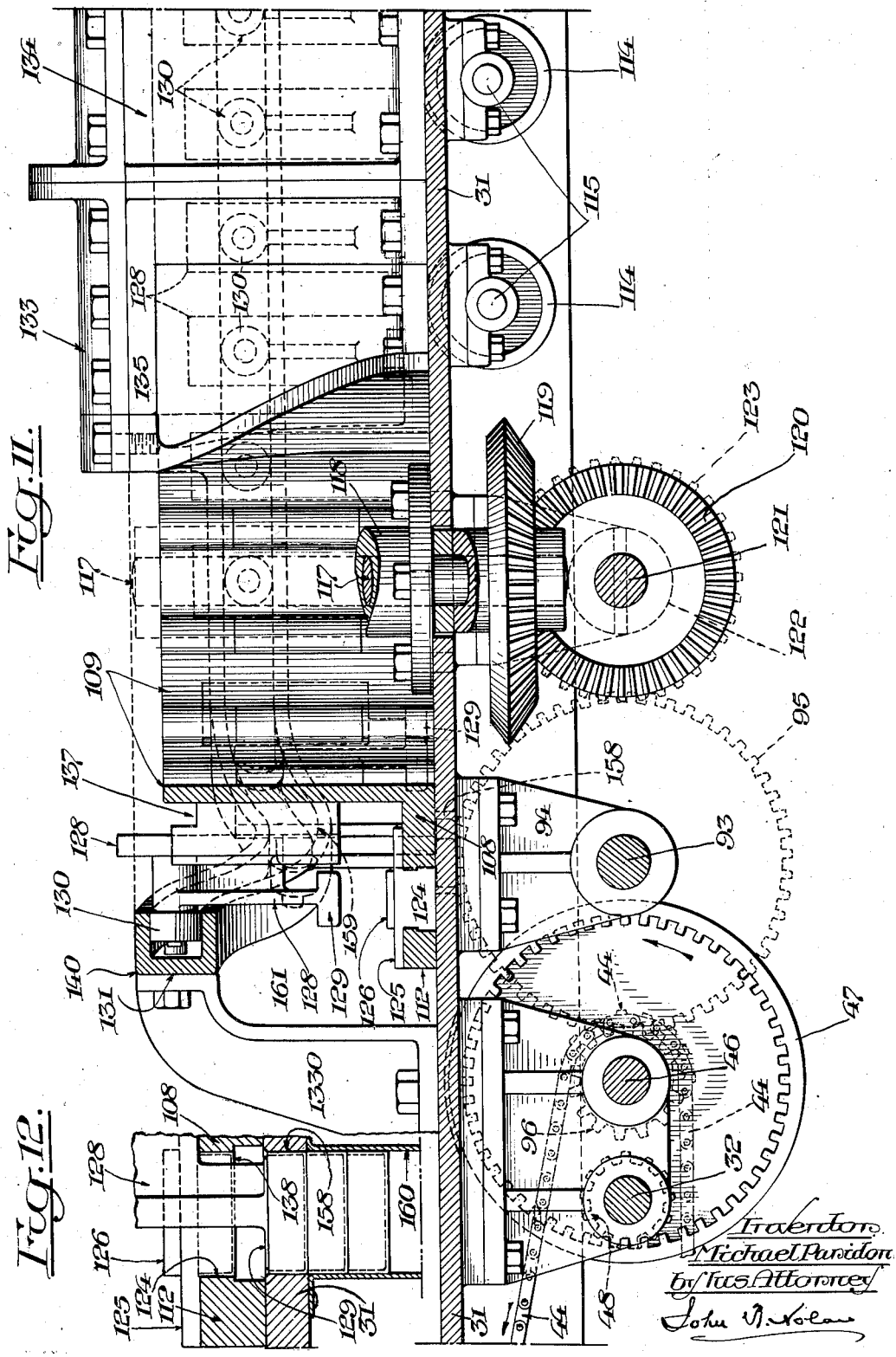

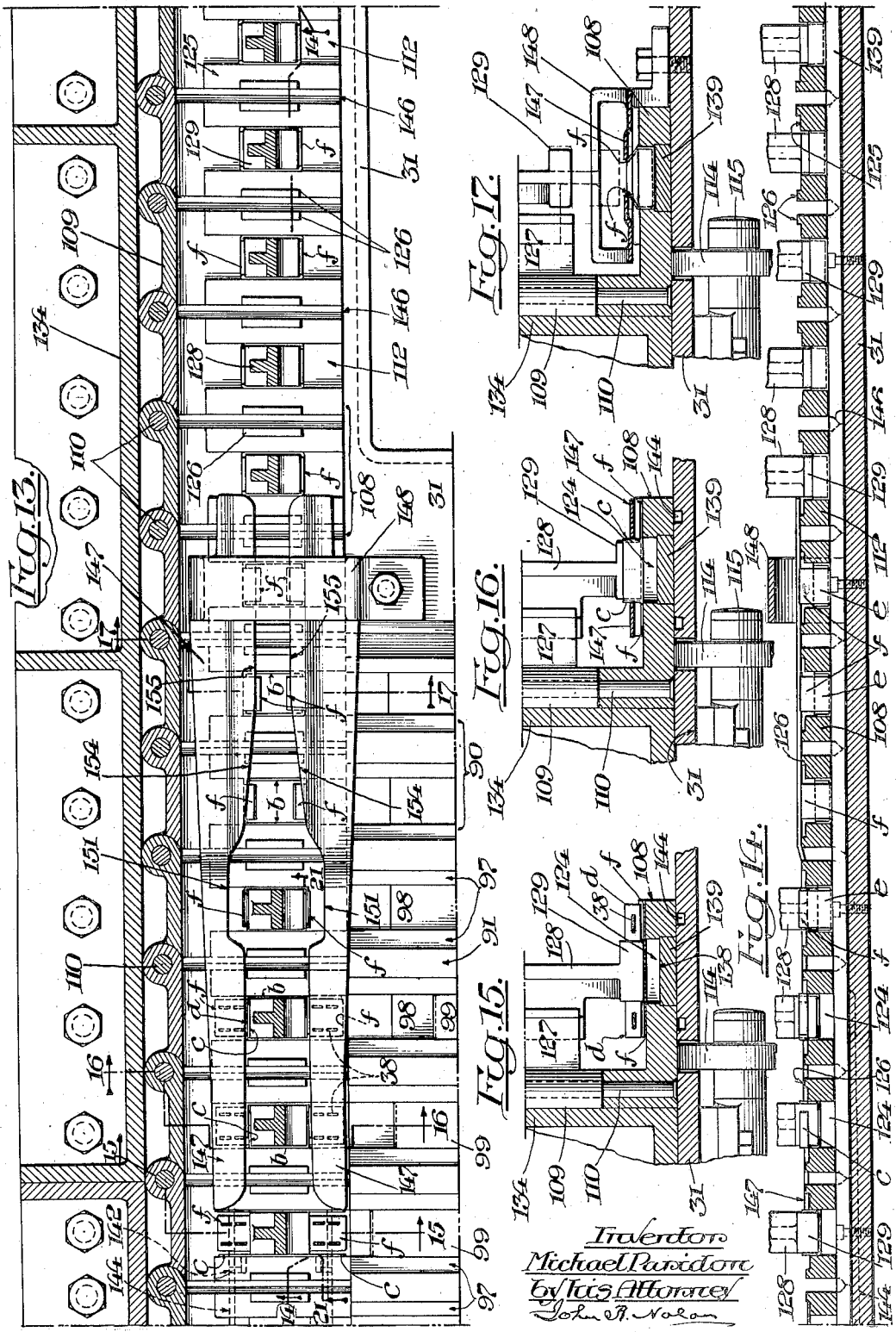

Oct. 23, 1934.  M. PARIDON  1,978,057
MACHINE FOR MAKING BOX TRAYS
Filed June 10, 1933  14 Sheets-Sheet 12
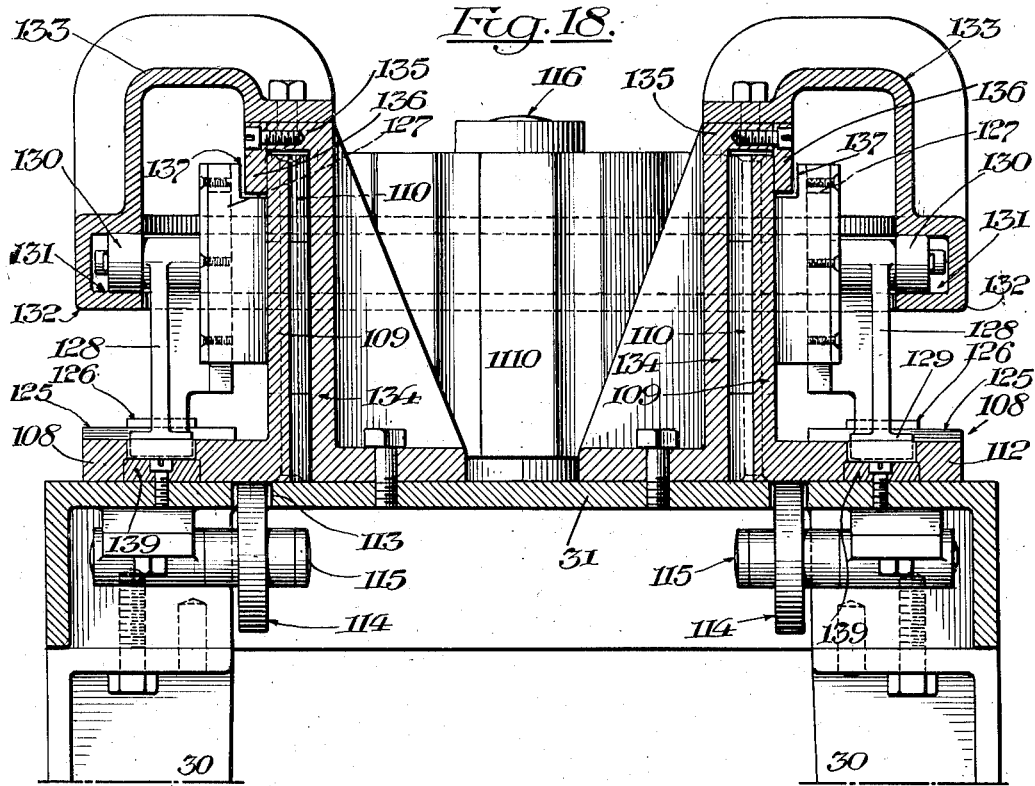
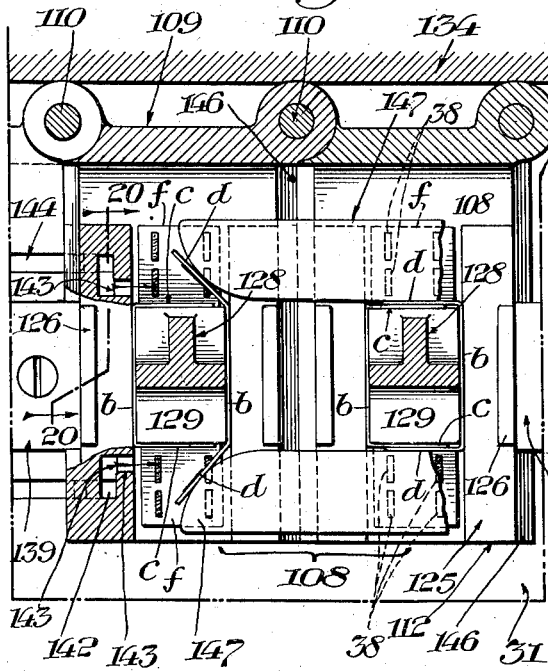
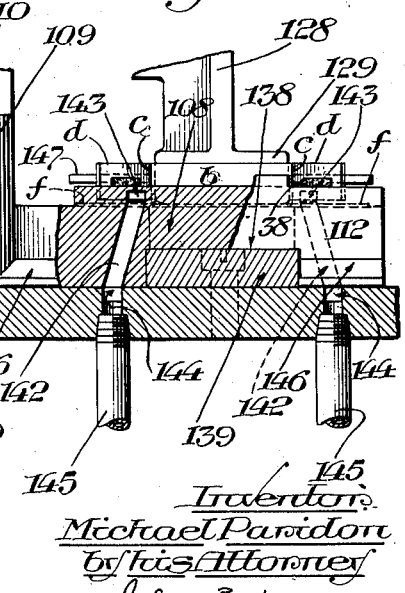

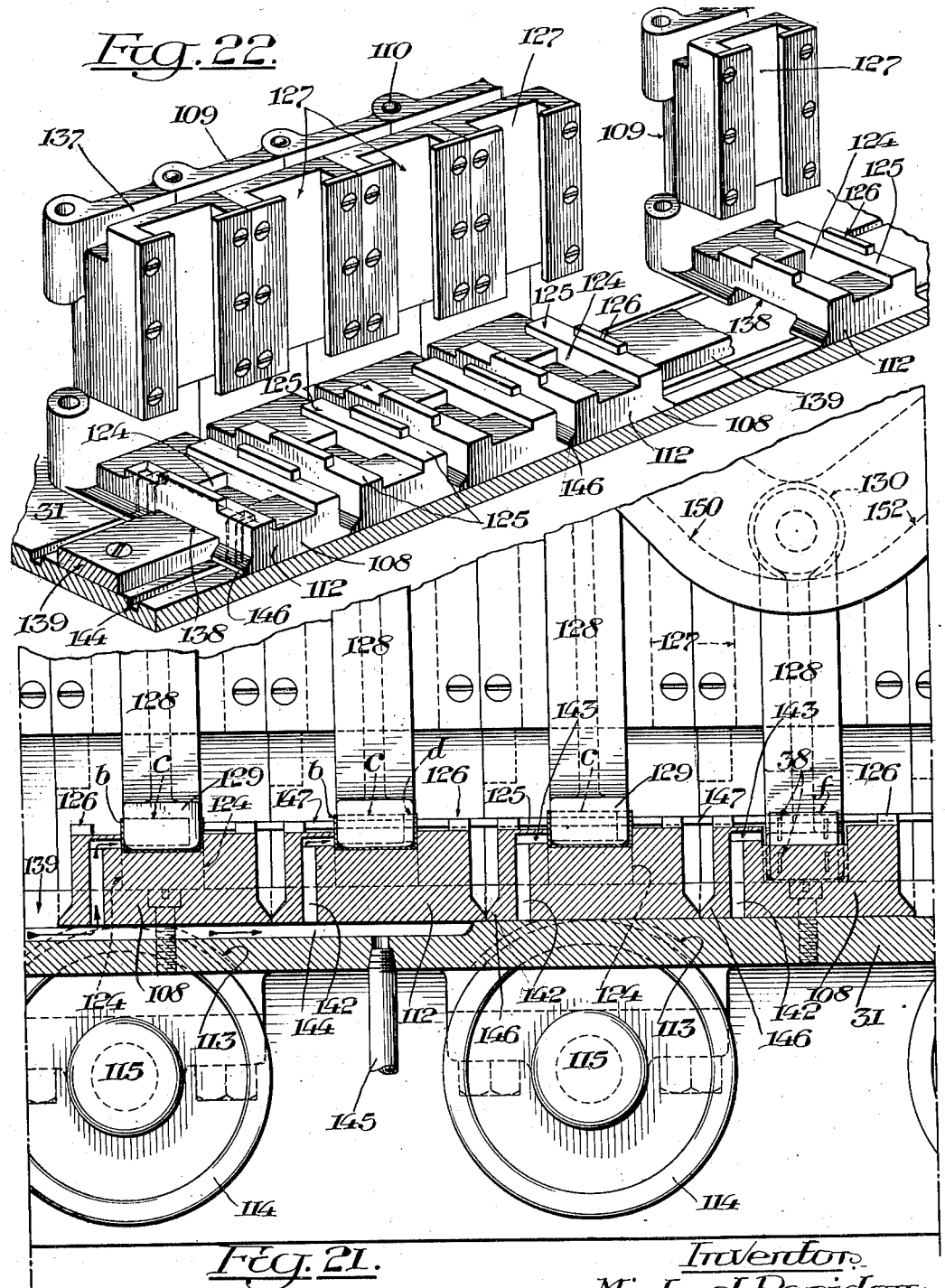

Oct. 23, 1934.   M. PARIDON   1,978,057
MACHINE FOR MAKING BOX TRAYS
Filed June 10, 1933   14 Sheets-Sheet 14
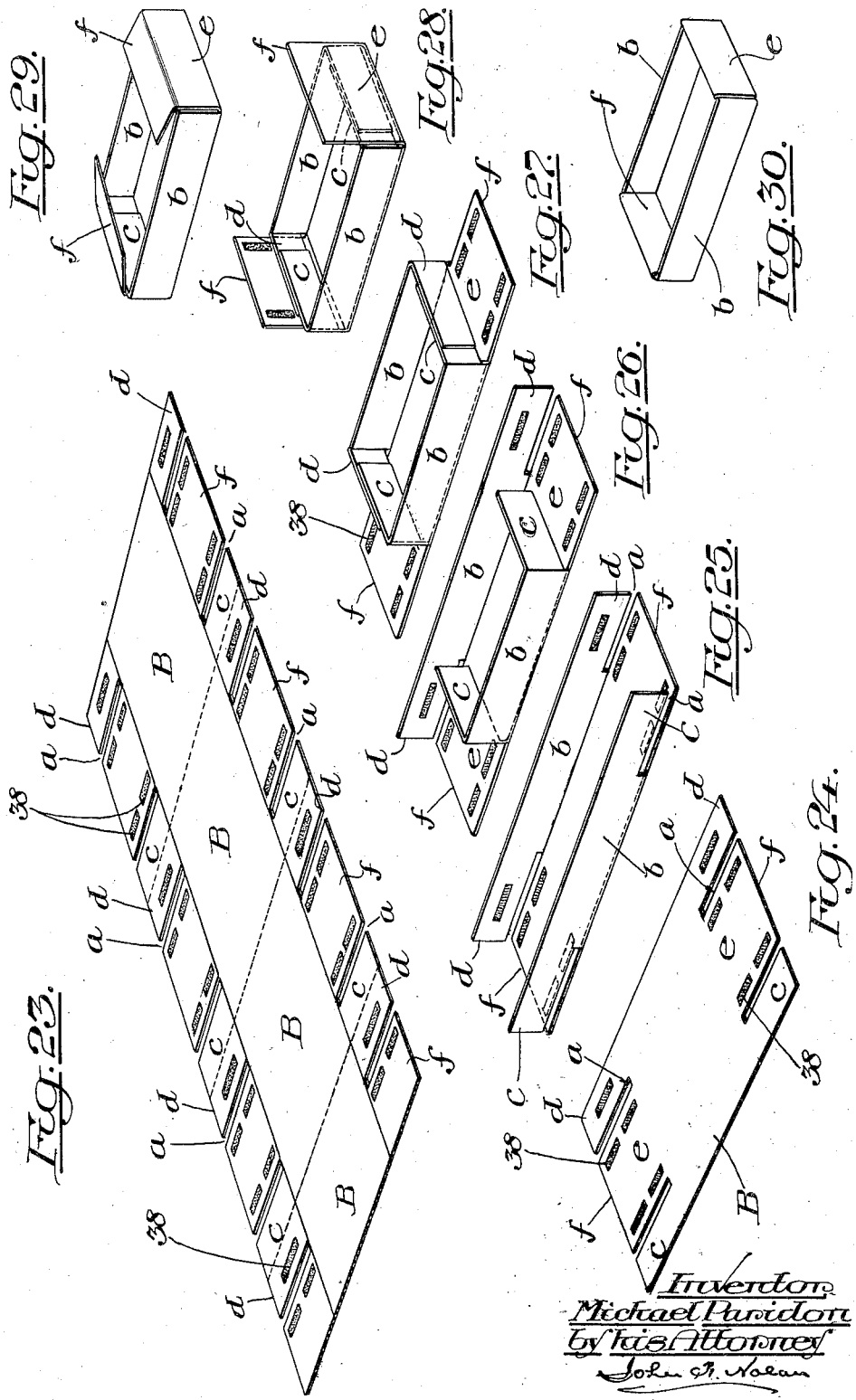

Patented Oct. 23, 1934

1,978,057

UNITED STATES PATENT OFFICE 1,978,057

MACHINE FOR MAKING BOX TRAYS

Michael Paridon, Barberton, Ohio, assignor to The Diamond Match Company, Baltimore, Md., a corporation of Maryland Application June 10, 1933, Serial No. 675,226

18 Claims. (Cl. 93—51)

This invention relates to machines for making box trays, more especially pasteboard match box trays whereof the end walls are reinforced and strengthened by inturned integral folds or extensions of the tray material.

In prior machines for this purpose a strip or web of pasteboard, or similar material, was drawn from a roll of stock and fed intermittently through the tray making cycle, including glue applying, slotting, blank-cutting and box-forming mechanisms. The effective speed of such machines was necessarily limited on account of the delayed operation of the various mechanisms incident to the intermittent progress of the tray material, and in consequence the out-put of the machines was relatively low.

It is the object of my invention to provide a box-tray machine wherein the stock is continuously and uninterruptedly impelled, and wherein the various tray-forming mechanisms effect their sequential operations on the travelling stock in such manner as to ensure the production of box trays in a rapid and efficient manner.

In the embodiment of my invention herein illustrated feed means operative to impel a web of tray stock continuously and uninterruptedly is provided. As the web progresses spots of glue or other adhesive are applied at intervals to the marginal portions of the web. Thereupon the web travels across the paths of devices which punch or slit the margins relatively to the glue spotted areas to provide bendable flap members. Thence the web progresses across the path of a cutter which severs succeeding tray blank lengths from the leading end of the travelling web. Each blank as it is severed from the web is deposited upon a continuously moving conveyer which transports the succeeding blanks flatwise and in spaced parallel relation. During their transportation the blanks are successively transferred to a continuously moving former conveyer, including complementary die members and former plungers, which plungers are successively actuated to depress the opposing tray blanks in the adjacent die members and thereby bend up the sides of the blanks. Thereupon the ends of the trailing sides of each succeeding blank are rapidly turned inward against the opposing former plunger by suitably-disposed pneumatic means; following which, as the former conveyer continues its progress, the glue-spotted projecting flaps of the upturned leading side of the blank are bent inward and against the previously folded end flaps. The former plungers are actuated further to depress each succeeding partially folded blank in its die member in a manner to bend the glue-spotted bottom end flaps against the previously folded end flaps, which bottom flaps then project above the previously folded flaps and present glue-spotted reinforcing extensions. In the continued progress of the former conveyer these extensions are bent inwardly over the folded ends of the tray body, and the plunger is then again depressed so as to bear upon the overhanging extensions and fold them down into the tray and hard against the adjacent folded flaps, thus providing a reinforced end wall at each end of the tray. In the second downward stroke of the plunger it forces the opposing tray to the bottom of the die member and remains in that position a sufficient period to insure the setting and drying of the glued-ends of the travelling tray, whereupon the former plunger is still farther depressed to push the completed tray from the die member of the conveyer.

The invention also comprises novel features of construction and combinations of parts which will be hereinafter described, the scope of the invention then being expressed in the appended claims.

In the drawings—

Fig. 6 is a longitudinal vertical section in a plane through the paper feeding, punching and cutting mechanisms, as on the line 6—6 of Fig. 3, showing the adjacent portions of the tray-blank conveyer and adjuncts.

Fig. 7 is a similar section in a plane through the stock punching and cutting carriage, as on the line 7—7 of Fig. 6.

Fig. 8 is a similar section through the carriage, adjacent the punches, as on the line 8—8 of Fig. 6.

Fig. 9 is a similar section in a plane through the juxtaposed tray-blank, tray blank transferring and tray forming conveyers, and adjuncts, as on the line 9—9 of Fig. 3.

Fig. 10 is a horizontal section in a plane through the former conveyer, as on the line 10—10 of Fig. 9, showing in plan the adjacent portion of the tray-blank conveyer and the associated transfer conveyer.

Fig. 11 is a partial longitudinal vertical section in a plane through the receiving and discharging portions of the former conveyer, and adjuncts, as on the line 11—11 of Fig. 3.

Fig. 12 is a detail section through the tray discharging portion of the former conveyer.

Fig. 13 is a horizontal section through the former conveyer in the region of the longitudinally extending folder blades for the reinforcing end extensions of the tray blanks.

Fig. 14 is a longitudinal vertical section, as on the line 14—14 of Fig. 13.

Fig. 15 is a transverse vertical section in a plane through the former conveyer, as on the line 15—15 of Fig. 13, showing a tray blank as seated on a die member of the conveyer and the complementary former plunger as initially depressed.

Fig. 16 is a similar section, as on the line 16—16 of Fig. 13, showing the end flaps on the leading side of the tray blank as folded inward and against the foot of the former plunger.

Fig. 17 is a similar section, as on the line 17—17 of Fig. 13, showing the blank depressed in the die member and the former plunger elevated, the reinforced end extensions being turned inward preparatory to the next succeeding descent of the plunger.

Fig. 18 is a similar section through the former conveyer, and adjuncts, as on the line 18—18 of Fig. 4, showing the former plunger in down position within the box trays in the conveyer.

Fig. 19 is a horizontal section of a portion of the former conveyer adjacent the receiving ends of the longitudinal folder blades, showing the action of the pneumatic folding means on the end flaps of the leading side of a tray blank, and the action of the folder blades at this juncture.

Fig. 20 is a transverse vertical section through a portion of one of the die members in a plane through an air-duct, as on the line 20—20 of Fig. 19.

Fig. 21 is a longitudinal vertical section through a succession of die members of the former conveyer, as on the line 21—21 of Fig. 13, showing the former plungers positioned in said members and within the partially formed trays seated in the latter.

Fig. 22 is a sectional perspective view, showing a portion of the former conveyer with its plungers omitted.

Fig. 23 is a perspective view of a portion of a strip of tray stock which has been subjected to the glue-applying and punching operations, preparatory to the severance of a tray blank from the leading end of the strip.

Fig. 24 is a view of the blank.

Figure 1:
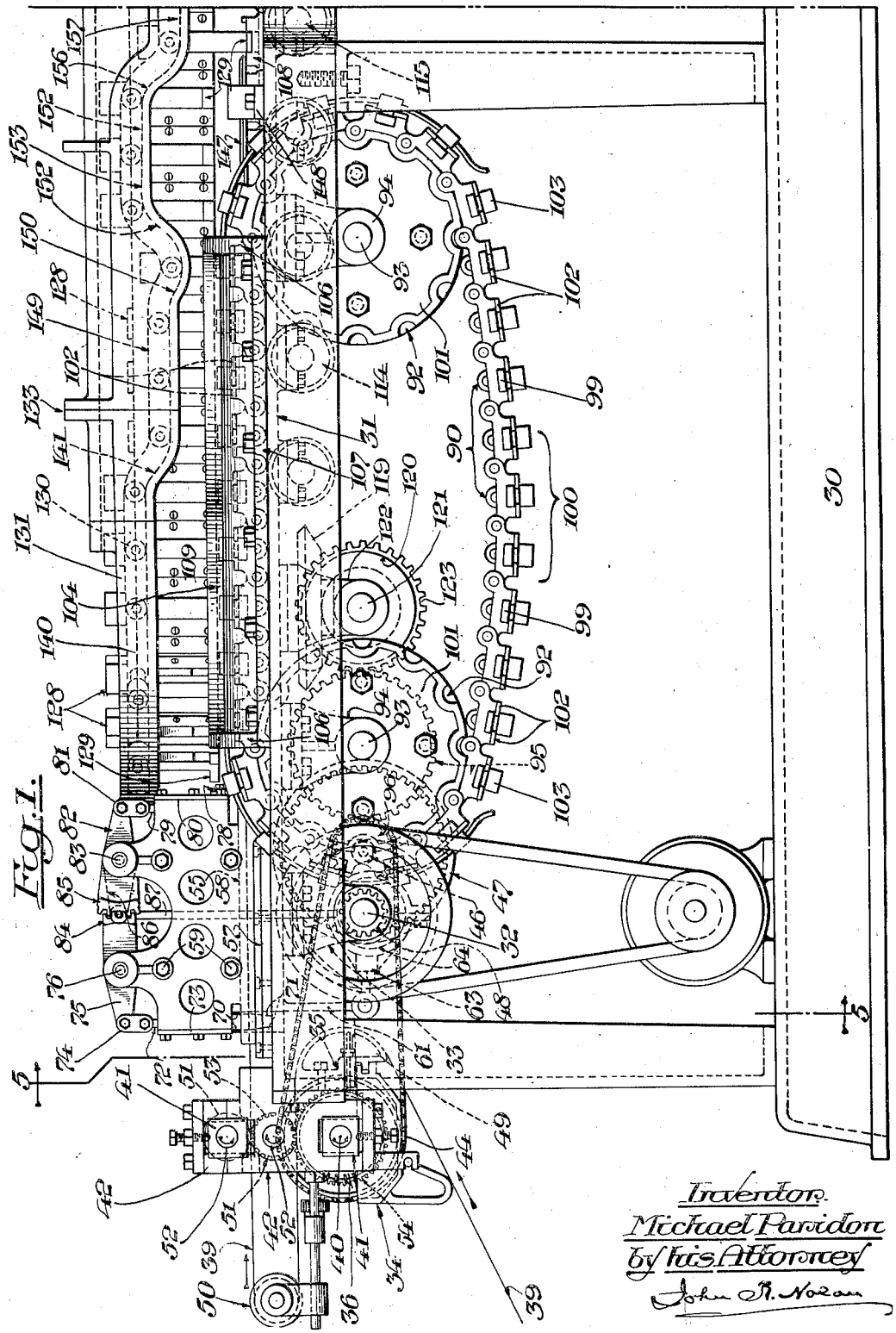
Figures 1 and 2 are succeeding views in front elevation of a complete tray-making machine embodying the principles of my invention.

Figs. 25 to 29, inclusive, illustrate successive conditions of the blank during the tray forming operations.

Fig. 30 shows a finished end-reinforced tray.

Referring to the drawings, 30 designates the main supporting frame, including a table 31, and 32 designates the main shaft journaled in suitable bearings in hangers 33 bolted to the underside of the table.

34 designates a glue pot mounted in a supporting structure 35 at the left or feeding end of the table, and 36 designates a glue-applying roll mounted to rotate in the glue pot. The periphery of the roll is provided with spaced projections 37 to apply relatively spaced spots or lines (38) of glue to the underside of a continuously travelling web of box-tray stock 39 drawn from a suitably-located roll (not shown). In the present instance the glue-applying roll is fast on a transverse shaft 40 which is journaled in bearing boxes 41 fitted in the sides of a housing 42 which is bolted to the adjacent end of the table 31. One end of this shaft 40 is provided with a sprocket wheel 43 which is connected with and continuously driven by a chain 44 from a similar wheel 45 on a shaft 46 adjacent and parallel with the main shaft. Fast on the shaft 46 is an internal gear 47 which meshes with and is continuously driven by a pinion 48 fast on the main shaft.

The supporting structure 35 is provided at its inner end with a curved guide member 49 upon which the tray stock is trained to travel outwardly in a horizontal path preparatory to its passage above the glue-applying roll. The stock, spotted on its underside with glue, progresses to and about a suitably disposed guide roll 50, thence in a horizontal path to and between a pair of co-acting feed rolls 51, the shafts 52 of which rolls are in vertical alignment with the glue-roll shaft and have their bearings in boxes in the housing 42. The lower roll 51 rotates in contact with the tray stock on the projections of the glue roll, thus serving as a pressure roller for the stock at this point. The shafts 52 of the feed rolls are provided with co-acting gears 53, the lower of which meshes with a gear 54 on the shaft 40 of the glue-applying roll, the ratio of the gearing being such that the feed rolls are rotated in timed relation to the glue-applying roll.

The tray stock 39 passes from the feed rolls to and along the horizontal bed 55 of a carriage which is slidably mounted on the table 31 so as to have capacity for limited reciprocation longitudinally of the table, the stroke of the carriage being equal to one-half the length of a tray blank (B).

In the present instance the carriage bed is formed with lateral longitudinally extending tongues 56 which are slidably fitted in parallel guides 57 on the table, and the bed is also formed or otherwise provided with upstanding side walls 58 whereof the inner faces are spaced substantially the width of the tray stock to afford a guide for the longitudinal edges of the travelling material. The side walls 58 are connected by upper and lower tie rods 59, and one of the lower rods is preferably provided with a light pressure spring 60 which bears yieldingly upon the travelling material and maintains it in contact with the bed.

Fast on the underside of the carriage bed 55 is a bifurcated bracket 61 which depends through a longitudinal opening 62 in the table, and which bracket is pivotally connected by means of a link 63 with a bearing or strap 64 on a suitable eccentric 65 fast on the main shaft. Thus during the rotation of this shaft the carriage is horizontally reciprocated.

The outer end portion of the carriage bed 55 has secured therein flush with its upper surface a hard metal insert 66 and also an overlying transverse bar 67 which has its under surface offset to afford a passageway for the travelling tray-stock. The insert and bar are provided at the respective ends of the passageway with aligning pairs of suitable slots 68 and 69, respectively, for the guidance of vertically reciprocating punches 70 which in their descent during the rearward stroke of the carriage form spaced transverse slots (a) at the respective sides of the concurrently moving stock. The bed 55 has formed therein below the respective slots 68 flared openings 71 for the free escape of the material punched from the stock.

The punches 70 depend from a cross-head 72 which is slidably fitted in vertical guideways 73 in the walls 58 of the carriage, and the upper end of the cross-head is connected by means of a link 74 to a lever 75 fast on a fulcrum shaft 76 which is journaled in bearings in said walls. Thus when the lever is oscillated as hereinafter described the cross-head and its punches are vertically reciprocated.

The inner end portion of the carriage bed has therein a hard metal insert 77 with the outer edge of which co-acts a vertically reciprocable cutter blade 78 to sever a box-tray blank (Fig. 24) from the leading end of the travelling punched stock (Fig. 23) during each forward stroke of the carriage. The cutter blade is carried by a cross-head 79 which, similarly to the punch cross-head, is slidably fitted in guideways 80 in the walls 58 of the carriage, and which cutter cross-head is likewise connected by means of a link 81 to a lever 82 fast on a fulcrum shaft 83 which is journaled in bearings in said walls. Hence when the lever 82 is actuated the cross-head 79 and its blade 78 are vertically reciprocated. (See Figs. 1, 3, 5, 6 and 7.)

As a simple and efficient means to operate the two levers 75 and 82 simultaneously and in timed relation to the carriage, the inner arms of the levers are provided with intermeshing gear sectors 84 and 85 respectively, and one of the fulcrum shafts is equipped with a crank-arm 86 which is connected by means of a rod 87 with the bearing or strap 88 of a suitable eccentric 89 fast on the main shaft. Hence, during the rotation of this shaft the punches and the cutter are simultaneously reciprocated in the same direction.

The two eccentrics are so relatively positioned on the main shaft that during the stroke of the carriage in the direction of motion of the tray stock, the punches and the cutter descend, thus travelling with the web while acting thereon. Upon the completion of this stroke of the carriage and also during its succeeding return stroke, the punches and cutter are raised so as to be in position for a succeeding descent when the carriage reaches the end of the return stroke, whereupon the punching and cutting actions are repeated upon succeeding underlying portions of the tray stock; and so on during the continuous progress of the stock through the carriage.

The carriage in its stroke in the direction of movement of the stock moves at the same speed as the stock, and since the stock continues its progress during the succeeding return stroke of the carriage, and as the length of such stroke is one-half the width of a tray blank, it is evident that each succeeding section of the progressing stock subjected to the actions of the punches and the cutter corresponds with the width of a blank, and therefore the succeeding leading portions of the stock projected beyond the carriage bed constitutes tray blanks when they are severed from the stock by the cutter blade.

As each succeeding punched blank is produced it is received by a continuously moving conveyer 90 in such manner that a succession of equally spaced flatwise-disposed blanks is advanced to a position for transference to tray forming instrumentalities.

In the present instance this blank receiving conveyer comprises an endless chain of hingedly connected links 91 having an upper horizontal run supported on the table and extending longitudinally from the inner end of the carriage bed 55. This conveyer passes about spaced sprocket wheels 92 carried by transverse shafts 93 which have their bearings in hangers 94 beneath the table, the shaft adjacent the carriage bed having fast thereon a gear 95 in mesh with a gear 96 on the driven shaft 46. Thus the blank receiving conveyer is continuously driven so as to position the links for the efficient reception of the tray blanks as the latter are successively severed at the inner end of the carriage.

As herein illustrated the links of the conveyer 90 are formed with spaced parallel shoulders 97 extending transversely thereof in such relation that when two adjacent links are in horizontal position a pocket therebetween of proper width to receive a tray blank (B) is provided. (See Figs. 3, 6 and 10.) The adjacent hinged edges of the complementary links are offset, as at 98, to afford in the links, when horizontally disposed, a guide channel for a reciprocative plunger 99 which is operative to eject the opposing tray blank endwise from the pocket, as will presently appear.

As each link of the conveyer 90 approaches and assumes a horizontal position adjacent the carriage, coincident with the travel of the leading end of the tray stock, such end rests on the opposing trailing shoulder of the link and travels slightly therewith, whereupon the blank is severed by the cutter 78 and the trailing edge of such blank drops upon the opposing leading shoulder of the next succeeding link, following which the latter link assumes its horizontal position, and the blank is nicely seated in and transversely of the pocket formed by the two links. The leading end of the tray stock then rests upon the trailing shouldered portion of said latter link, and a succeeding blank being severed as before from such end by the cutter blade, drops upon the opposing leading shoulder of the next following link. When the latter link assumes a horizontal position the new blank is seated in the pocket formed by the adjacent links; and so on. Thus the tray blanks as rapidly as they are severed from the continuously moving tray stock are received by adjacent links of the conveyer and thereby transported in spaced parallel relation.

Adjacent the front side of the blank conveyer 90 and parallel therewith is a transfer conveyer 100 comprising an endless chain of links passing about sprocket wheels 101 which are bolted or otherwise secured to the adjacent sprocket wheels 92 for the blank conveyer. The links of the conveyer 100 are transversely channeled and provided with overhanging guide pieces 102 to afford guideways for a continuous succession of the reciprocative plungers 99, respectively, thus constituting a plunger conveyer. The channels in the links of the horizontal runs of the juxtaposed conveyers 90 and 100 align with each other during the concurrent travel of the conveyers, and hence the plungers in the horizontal run of the conveyer 100 can be reciprocated into and from the adjacent channels of the blank supporting conveyer 90 in a manner to eject the opposing blanks flatwise beyond the opposite side of the latter conveyer. The plungers 99 are gradually advanced to eject the blanks and are then gradually retracted transversely of the horizontal runs of the two continuously travelling conveyers. As a simple and efficient means for this purpose each of the plungers is provided with a projecting roll 103 which enters in and travels through a flattened V cam track 104 in the underside of a stationary plate 105 overhanging the path of the plungers in the horizontal run of the transfer conveyer, the forward edge of the plate being curved downward, as at 106, and terminating in a base 107 that is bolted on the top of the table. (See Figs. 3, 5, 9 and 10.)

The succeeding tray blanks positioned on the blank conveyer are gradually pushed by the plungers 99 to and upon a continuously travelling former conveyer 108 mounted on the table at the rearward side of the blank conveyer, which former conveyer embodies means whereby the blanks transferred thereto are progressively formed into box-trays and the completed trays then finally discharged from the machine.

The former conveyer 108 comprises an endless chain of angular links constructed and arranged to travel in an extended horizontal path, with the horizontal members of one of the longitudinal runs of the chain in close parallel relation to the upper run of the transfer conveyer.

The vertical members 109 of the angular links are hingedly connected, as at 110, and pass about sprocket wheels 111 and 1110 which are rotatable on vertical axes adjacent the respective ends of the table; and the horizontal die-members 112 of the links project outwardly from the lower ends of the vertical members so as to travel along the table. The angular links are spaced correspondingly with the links of the transfer conveyer, and are moved at the same speed and in the same direction as the latter, so as to effect the registration of the die-members with the links of the transfer conveyer as such die-members approach and travel in parallelism with the upper run of such conveyer.

Figure 2:
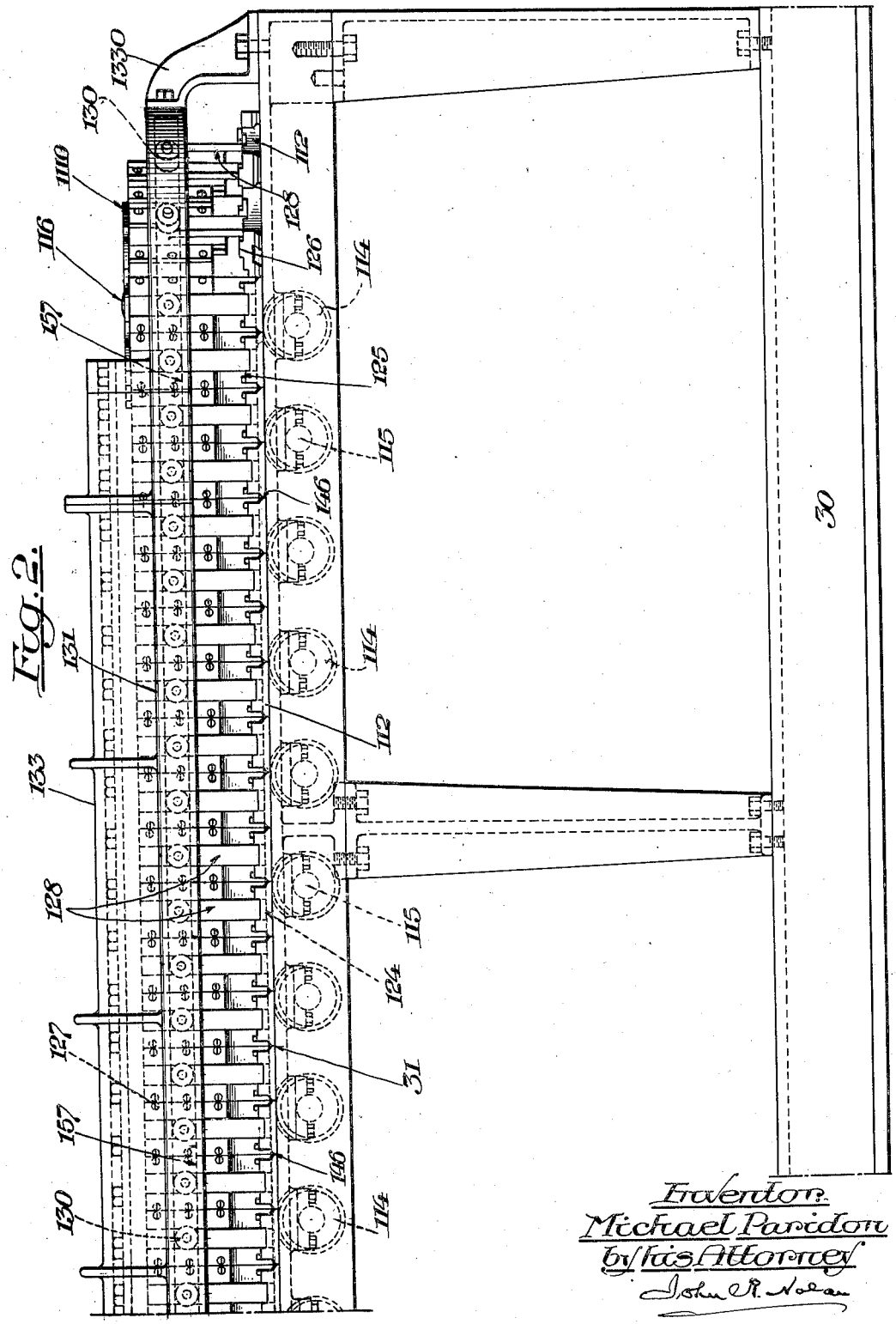
Figure 3:
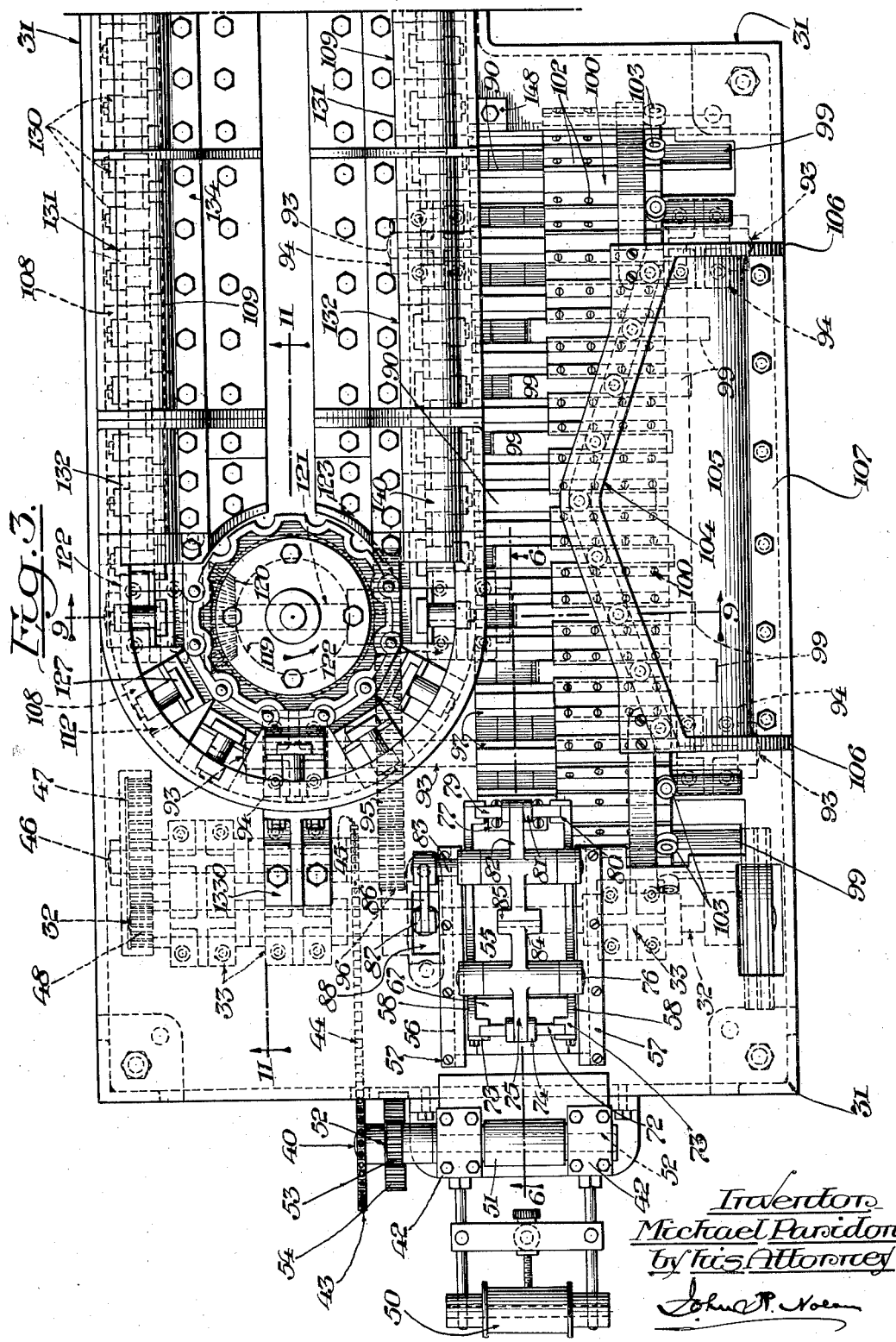
Figs. 3 and 4 are plan views of the mechanisms shown in Figs. 1 and 2, respectively, a portion of the former conveyer and the guide bar therefor on the table being broken away in Fig. 4.
Figure 4:
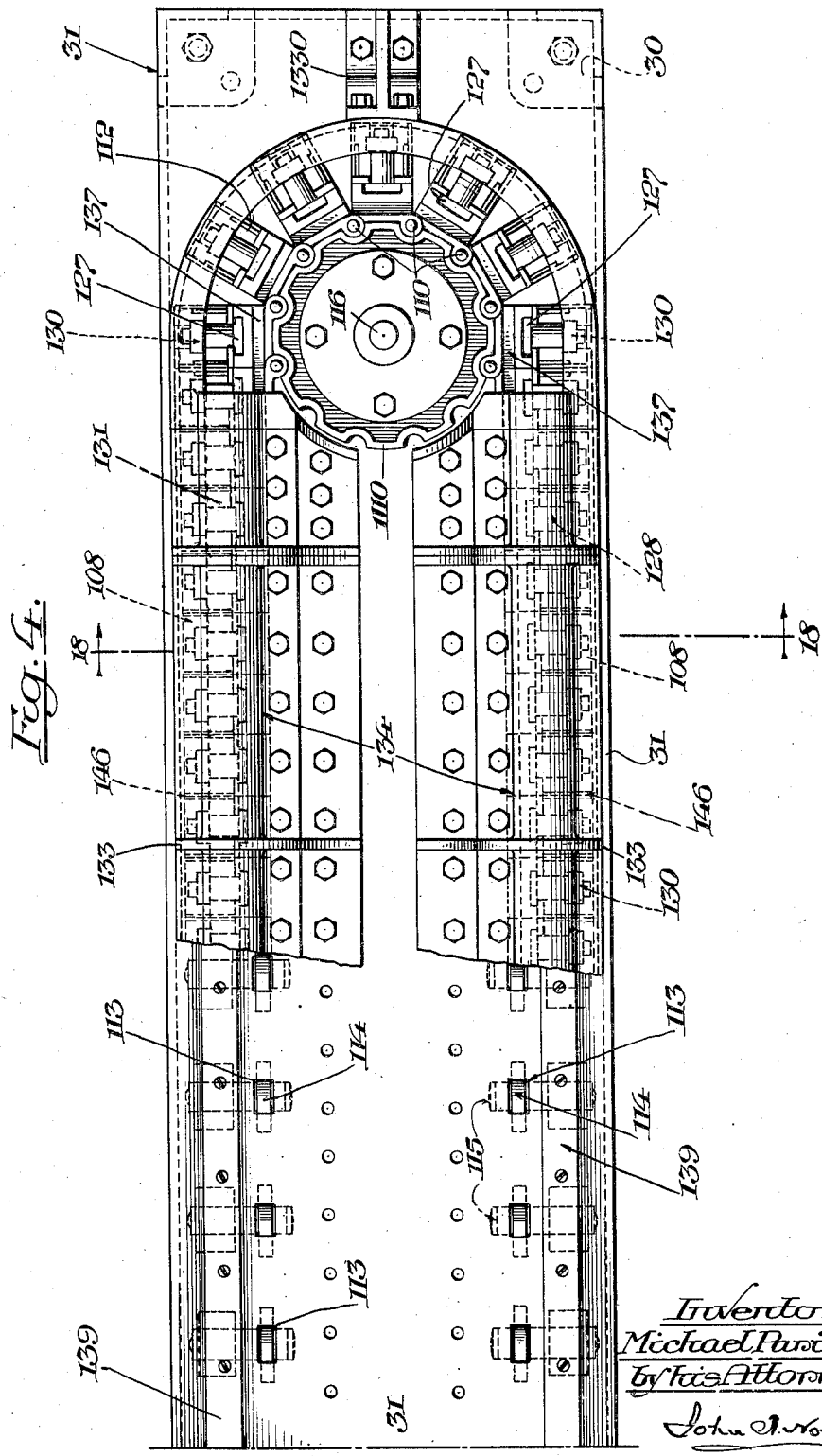
Figure 5:
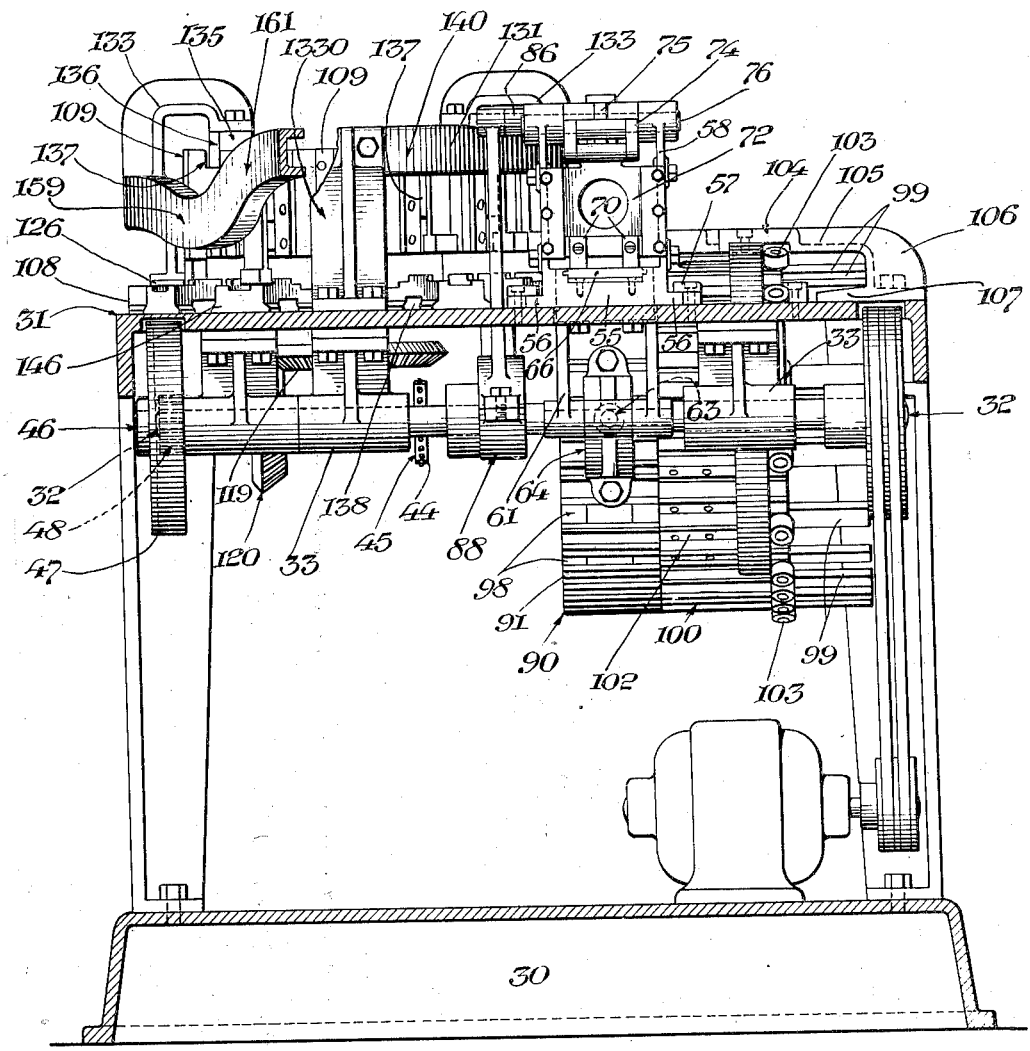
Fig. 5 is a transverse vertical section in a plane through the stock feeding end of the machine, as on the line 5—5 of Fig. 1, a portion of the cam track for the plungers of the former conveyer being broken away.

To reduce the friction of the heavy former conveyer 108 as it travels along the table, the latter is slotted at intervals, as at 113, below the longitudinal runs of the said conveyer, and anti-friction rollers 114 are mounted on suitably-disposed stud shafts 115 beneath the table, so as to turn within the respective slots and afford rolling supports for the conveyer. (See Figs. 2, 4 and 18.)

The sprocket wheel 1110 at the remote end of the table is loosely mounted on a vertical stud-shaft 116 rising from the table, while the sprocket wheel 111 at the opposite end of the table is fast on the upper end of a vertical shaft 117 which is journaled in a bearing stand 118 on the table. The shaft 117 extends below the table and bears a bevel gear 119 in mesh with a similar gear 120 on a transverse shaft 121 having its bearings in hangers 122 beneath the table, which latter shaft 121 has fast thereon a gear 123 in mesh with the gear 95 on the driven shaft 93 previously referred to. The ratio of the gearing just described is such that during the operation of the machine the former conveyer 108 is continuously driven in timed relation to the tray-blank and transfer conveyers.

As best seen in Fig. 22 each of the die-members 112 comprises a body having therein a rectangular matrix 124 corresponding in dimensions with those of the box tray to be formed. The sides of the body are raised to provide spaced parallel seats 125 which extend to the outer end of the body and in position to receive the longitudinal margins of a tray blank endwise transferred thereto and support the blank slightly above the matrix, and these seats are provided at the respective sides of the matrix with parallel flanges 126 which prevent sidewise displacement of the seated blank.

Each of the vertical link members 109 comprises a body having therein a vertical guide channel 127 for a vertically reciprocative plunger 128 the foot 129 of which aligns with and constitutes a complementary die for the matrix. (See Figs. 18, 19, 20 and 21.)

Each of the former plungers 128 is provided with an outwardly projecting roll 130 which travels in an endless trackway 131 formed in a stationary rail structure 132 overhanging the link dies 112 throughout their circuit, said trackway being formed to effect the raising and lowering of the plunger at stated intervals during the travel of the former conveyer, as will presently appear.

The rail structure comprises two series of parallel longitudinal side sections and semi-circular end sections, the whole being rigidly connected and supported by outboard brackets 133 extending from upstanding wall sections 134 which are bolted to the table adjacent the respective longitudinal paths of the vertical link members of the former conveyer. The semi-circular end sections are also supported by brackets 1330 rising from the table. The wall sections 134 act as guide and backer members for the vertical link members 109 during their travel. Such wall sections are provided with longitudinal top flanges 135 which overhang the upper edges of the members 109, and which flanges have secured thereto guide strips 136 that are received by a longitudinal groove 137 formed in the top of the members, thereby maintaining the latter in vertical position during their travel.

The horizontal disposed die-members 112 are transversely recessed in their undersides and the recesses 138 thus formed are slidably fitted on guide-bars 139 which are secured to the table in parallelism with the longitudinal runs of the former conveyer, thus ensuring the alignment of the die-members of the respective runs during their continuous travel. The guide-bars 139 afford bottoms for the matrices of the respective die-members travelling thereon. (See Fig. 22.)

A series of the former plungers 128 are supported in raised position by a horizontal portion 140 of the trackway 131 as they approach and travel adjacent the upper run of the blank conveyer 90, and as each succeeding leading plunger of the series reaches a position in line with the apex of the camway 104, or substantially so, the plunger is depressed by a cam decline 141 of the trackway, thus causing the foot 129 of such plunger to force the opposing tray blank upon the body of the die-member and between the lateral parallel seats 125, as seen in Figs. 20 and 21. Thus the side walls of the blank are bent to stand upward, as indicated at *b* in Fig. 25, preparatory to the next succeeding step of inwardly bending the end folds of one of the side walls of the blank, as indicated at *c* in Fig. 26.

Such latter bending operation is effected by the action of properly directed air blasts against the opposing end folds of the blank immediately upon the descent of the plunger foot, at which time the foot serves as an angular support or former for the inturned folds.

The preferred form of pneumatic means is as follows:

Formed in each of the die-members 112 adjacent the trailing side thereof are two spaced ducts 142 which open through the bottom of the member and terminate at their upper ends in horizontal branches or nozzles 143 leading to the spaces occupied by the end portions of the trailing up-turned side of the blank which is seated in the die-member. (See Figs. 19, 20, 21 and 22.)

During the travel of the die-member when the complementary former plunger 128 is depressed therein, the open lower ends of the ducts 142 register with parallel longitudinal channels 144 formed in the top of the table, which channels are connected by means of pipes 145 with a source of air supply. Air under pressure escapes through the ducts 142 and blows inward and against the foot of the plunger the opposing end folds $c$ of the partially folded tray blank. The dies are formed with lateral basal flanges 146 so arranged that those of adjacent dies are in close contact, thus precluding the escape therebetween of the air from the channels as the die-members travel upon the ducts.

While the trailing end folds $c$ of the tray blank are being blown inward as just described the leading end folds $d$ come in contact with and are supported by the opposing flared ends of a pair of spaced longitudinally extending folding blades 147 which overlie the ends of the die-members, and which blades are supported at their remote ends by a suitable overhanging bracket 148 fixed on the table. Thus the end folds $d$ on the leading side of the blank are not displaced by the action of the air blasts.

As each succeeding die-member 112 continues its travel the complementary plunger 128 therein progresses through a short horizontal portion 149 (Fig. 1) of the trackway 131 and is thereby maintained in down position. During this period of travel of the die-member the opposite inner faces of the folding blades 147 effectually press and iron the glue-spotted leading end folds $d$ against the opposing folds $c$ and the foot of the plunger. (See Figs. 13, 19, 20 and 27.) This done the plunger of said die-member is farther depressed by a cam decline 150 of the trackway 131 to force the blank to the bottom of the matrix, thus bending upward the respective glue-spotted ends $e$ of the bottom of the blank against the previously inturned ends as seen in Figs. 13, 14 and 28; it being noted that at this folding point the opposite inner edges of the blades are recessed, as at 151, to permit the free upward swinging of the bottom end folds. Thereupon the former plunger of the travelling die-member is raised to its normal position by an upwardly inclined portion 152 of the trackway 131 leading to a horizontal portion 153 thereof.

As the die-member continues its travel the plunger 128 progresses through the track portion 153 and is thereby temporarily maintained in raised position. During this period of travel of the die-member, the up-standing extensions $f$ of the bottom end folds bear against the inwardly tapering edges 154, (Fig. 13) of the blades 147 and are thereby gradually bent over the previously folded end flaps $c$ and $d$, as indicated in Fig. 29. The tapering edges of the folding blades merge with straight parallel portions 155 of the blades. When the elevated former plunger reaches the end of the track portion 153 it is fully depressed by a cam incline 156 of the trackway leading to an extended horizontal portion 157 thereof. Thus the plunger forces the opposing inwardly bent glue-spotted reinforcing end extensions $f$ into the partially formed tray and hard against the previously folded overlapping ends of the latter. Thereupon the plunger is maintained in its down position within the tray by means of the straight track portion 157 until the tray has been carried through a prolonged setting and drying path to a position adjacent the sprocket wheel 111 where the open bottom of the matrix of the die-member leaves the underlying guide-bar 139 and registers with a suitable opening 158 in the table. (See Figs. 10 and 12.) At this juncture the plunger of the die-member is again depressed by a cam decline 159 of the trackway, thereby forcing the finished tray into the opening 158 of the table wherein it is frictionally held. The tray ejected from the next succeeding die-member pushes the preceding tray from the table opening into a suitable chute 160 depending from the table, and so on.

Following the ejection of each tray from a die-member the complementary former plunger is raised by a cam incline 161 merging with the horizontal portion 140 of the trackway, and hence the raised plunger progresses to the cam decline 141 preparatory to a repetition of the tray forming operation hereinbefore described.

From the foregoing described construction it will be seen that a high speed machine is provided embodying coordinated means whereby a web of tray stock is continuously impelled; whereby the slotting or slitting of the web and the severing of succeeding uniform tray blanks therefrom are respectively accomplished in an efficient manner during the uninterrupted progress of the web; and whereby the blanks as rapidly as they are produced are continuously transported flatwise and in parallel relation to a location where they are uniformly transferred without interruption of their longitudinal travel to continuously progressing mechanisms which efficiently accomplish the succeeding tray forming operations on the travelling blanks.

It is to be understood that my invention is not limited to the construction herein disclosed, as the machine may be modified in various respects within the principle of the invention and the scope of the appended claims.

I claim—

1. A tray making machine comprising means for continuously feeding a web of tray-stock, web slotting and tray-blank severing devices in co-operative relation to the path of the web, means for simultaneously operating said slotting and severing devices, means for moving said slotting and severing devices in the direction of motion of the web and back again, a blank conveyer comprising an endless chain of hingedly-connected complementary holder links and having an upper horizontal run extending longitudinally of and beyond the path of the web from a position adjacent the severing devices, whereby during the relative flexure of each succeeding pair of links while approaching and assuming a horizontal position adjacent said devices, the forward link of the pair receives and supports the leading end of the advancing web and the rearward link receives and supports the proximate end of the severed blank, and mechanism for continuously moving said conveyer in timed relation to and in the direction of travel of the web of tray-stock.

2. A tray making machine comprising means for continuously feeding a web of tray-stock, web slotting and tray-blank severing devices in co-operative relation to the path of the web, means for simultaneously operating said slotting and severing devices, means for moving said slotting and severing devices in the direction of motion of the web and back again, a conveyor having a succession of holders to receive the blanks flatwise in succession as they are severed from the leading end of the web, mechanism for continuously moving said conveyer in timed relation to and in the direction of travel of the web of traystock, and means for ejecting the succeeding tray-blanks flatwise from the continuously moving conveyer.

3. A tray making machine comprising means for continuously feeding a web of tray-stock, web slotting and tray-blank severing devices in co-operative relation to the path of the web, means for simultaneously operating said slotting and severing devices, means for moving said slotting and severing devices in the direction of motion of the web and back again, a conveyer having a succession of holders to receive the blanks flatwise in succession as they are severed from the leading end of the web, a second conveyer in juxtaposition to the first-named conveyer and including a succession of die-members and complementary former plungers therefor, means for transferring blanks in succession flatwise from the pockets of the first conveyer to the die-members of the second conveyer, mechanism for continuously moving said conveyers in timed relation to and in the direction of travel of the web of tray-stock, and means for successively operating said former plungers in respect to the die-members and the tray-blanks of said members during the travel of the second conveyer.

4. A tray making machine comprising means for continuously feeding a web of tray-stock, web slotting and tray-blank severing devices in co-operative relation to the path of the web, means for simultaneously operating said slotting and severing devices, means for moving said slotting and severing devices in the direction of motion of the web and back again, a conveyer having a succession of holders to receive the blanks flatwise in succession as they are severed from the leading end of the web, a second conveyer in juxtaposition to the first-named conveyer and including a succession of die-members and complementary former plungers therefor, means for transferring blanks in succession flatwise from the pockets of the first conveyer to the die-members of the second conveyer, mechanism for continuously moving said conveyers in timed relation to and in the direction of travel of the web of tray-stock, means for successively operating said former plungers in respect to the die-members and the tray-blanks of said members during the travel of the second conveyer, and means operative during the travel of the second conveyer and while the plungers are engaged with the die-members and associated tray-blanks, to fold the slotted end portions of said blanks in overlapping relation.

5. A tray making machine comprising means for continuously feeding a web of tray-stock, web slotting and tray-blank severing devices in co-operative relation to the path of the web, means for simultaneously operating said slotting and severing devices, means for moving said slotting and severing devices in the direction of motion of the web and back again, a conveyer having a succession of holders to receive the blanks flatwise in succession as they are severed from the leading end of the web, a second conveyer in juxtaposition to the first-named conveyer and including a succession of die-members and complementary former plungers therefor, means for transferring blanks in succession flatwise from the pockets of the first conveyer to the die-members of the second conveyer, mechanism for continuously moving said conveyers in timed relation to and in the direction of travel of the web of tray-stock, means for successively operating said former plungers in respect to the die-members and the tray-blanks of said members during the travel of the second conveyer, and means including air blast devices operative during the travel of the second conveyer and while the plungers are engaged with the die-members and associated tray-blanks, to fold the slotted end portions of said blanks in overlapping relation.

6. A tray making machine comprising means for continuously feeding a web of tray-stock, web slotting and tray-blank severing devices in co-operative relation to the path of the web, means for simultaneously operating said slotting and severing devices, means for moving said slotting and severing devices in the direction of motion of the web and back again, a conveyer having a succession of holders to receive the blanks flatwise in succession as they are severed from the leading end of the web, a second conveyer in juxtaposition to the first-named conveyer and including a succession of die-members and complementary former plungers therefor, means for transferring blanks in succession flatwise from the pockets of the first conveyer to the die-members of the second conveyer, mechanism for continuously moving said conveyers in timed relation to and in the direction of travel of the web of tray-stock, means for successively operating said former plungers in respect to the die-members and the tray-blanks of said members during the travel of the second conveyer, and means including spaced longitudinally extending folding blades operative during the travel of the second conveyer and while the plungers are engaged with the die-members and associated tray blanks, to fold the slotted end portions of said blanks in overlapping relation.

7. A tray making machine comprising means for continuously feeding a web of tray-stock, web slotting and tray-blank severing devices in co-operative relation of the path of the web, means for simultaneously operating said slotting and severing devices, means for moving said slotting and severing devices in the direction of motion of the web and back again, a conveyer having a succession of holders to receive the blanks flatwise in succession as they are severed from the leading end of the web, a second conveyer in juxtaposition to the first-named conveyer and including a succession of die-members and complementary former plungers therefor, means for transferring blanks in succession flatwise from the pockets of the first conveyer to the die-members of the second conveyer, mechanism for continuously moving said conveyers in timed relation to and in the direction of travel of the web of tray-stock, means for successively operating said former plungers in respect to the die-members and the tray-blanks of said members during the travel of the second conveyer, and means, including air blast devices and spaced longitudinally-extending folding blades, operative during the travel of the second conveyer and while the plungers are engaged with die-members and associated tray-blanks, to fold the slotted end portions of said blanks in overlapping relation.

8. A tray making machine comprising means for continuously feeding a web of tray-stock, web slotting and tray-blank severing devices in cooperative relation to the path of the web, means for simultaneously operating said slotting and severing devices, means for moving said slotting and severing devices in the direction of motion of the web and back again, a conveyer having a succession of holders to receive the blanks flatwise in succession as they are severed from the leading end of the web, a second conveyer in juxtaposition to the first-named conveyer and including a succession of die-members and complementary former plungers therefor, means for transferring blanks in succession flatwise from the pockets of the first conveyer to the die-members of the second conveyer, mechanism for continuously moving said conveyers in timed relation to and in the direction of travel of the web of tray-stock, and means for successively operating said former plungers in respect to the die-members and the tray-blanks of said members during the travel of the second conveyer, said last-named means including an endless cam track and members on the plungers mounted to travel in said cam track.

9. A tray making machine comprising mechanism for severing blanks in succession from the leading end of a continuously travelling web of tray-stock, a conveyer comprising an endless chain of hingedly-connected complementary holder links and having an upper horizontal run extending longitudinally beyond the path of the web from a position adjacent the severing mechanism, whereby during the flexure of each succeeding pair of links while approaching and assuming a horizontal position adjacent said severing mechanism, the forward link of the pair receives and supports the leading end of the advancing web and the rearward link receives and supports the proximate end of the severed blank, and mechanism for continuously moving said conveyer in timed relation to and in the direction of travel of the web of tray-stock.

10. A tray making machine comprising mechanism for severing blanks in succession from the leading end of a continuously travelling web of tray-stock, a conveyer comprising an endless chain of hingedly-connected complementary holder links and having an upper horizontal run extending longitudinally beyond the path of the web from a position adjacent the severing mechanism, whereby during the flexure of each succeeding pair of links while approaching and assuming a horizontal position adjacent said severing mechanism, the forward link of the pair receives and supports the leading end of the advancing web and the rearward link receives and supports the proximate end of the severed blank, mechanism for continuously moving said conveyer in timed relation to and in the direction of travel of the web of tray-stock, and means for ejecting the succeeding tray-blanks flatwise from the continuously moving conveyer and at right angles thereto.

11. A tray making machine comprising a former conveyer embodying an endless chain of angular links mounted to travel in a horizontal path, each link comprising a vertical portion and a horizontal base portion, the vertical portions of the adjacent links being hingedly connected and having vertical plunger guides therein, and the horizontal portions of said links constituting die-members for the reception of tray-blanks, complementary reciprocating former plungers for said die-members, said plungers slidably mounted in the vertical portions of the chain links, means for continuously moving said conveyer, means for feeding tray-blanks to the succeeding travelling die-members, and means for actuating the former plungers in timed relation to the conveyer during the travel of the latter.

12. A tray making machine comprising a former conveyer embodying an endless chain of angular links mounted to travel in a horizontal path, each link comprising a vertical portion and a horizontal base portion, the vertical portions of the adjacent links being hingedly connected and having vertical plunger guides therein, and the horizontal portions of said links constituting die-members for the reception of tray-blanks, complementary reciprocating former plungers for said die-members, said plungers slidably mounted in the vertical portions of the chain links and having cam-engaging members, means for continuously moving said conveyer, means for feeding tray-blanks to the succeeding travelling die-members, and a stationary structure having an endless cam track for the said cam-engaging members, whereby the former plungers are actuated in timed relation during the travel of the conveyer.

13. A tray making machine comprising a former conveyer embodying a succession of tray die-members, each having in one side thereof adjacent its respective ends air-ducts to discharge across the upper face of the die-member, and embodying also complementary reciprocative former plungers for said die-members, means for continuously moving said conveyer, means for feeding to the succeeding travelling die-members tray-blanks having bendable end flaps, means for independently reciprocating the former plungers in timed relation during the travel of the conveyer, said plungers partially forcing the blanks into the succeeding die-members to bend up the side portions of each succeeding blank and present the end flaps of the trailing side portion of the blank to the inwardly bending action of the blasts from the said air-ducts while the plunger is seated on the blank, and means for supporting the end flaps of the leading side portion of the blank in opposition to the air pressure.

14. A tray making machine comprising a former conveyer embodying a succession of tray die-members, each having in one side thereof adjacent its respective ends air-ducts to discharge across the upper face of the die-member, and embodying also complementary reciprocative former plungers for said die-members, means for continuously moving said conveyer, means for feeding to the succeeding travelling die-members tray-blanks having bendable end flaps, means for independently reciprocating the former plungers in timed relation during the travel of the conveyer, said plungers partially forcing the blanks into the succeeding die-members to bend up the side portions of each succeeding blank and present the end flaps of the trailing side portion of the blank to the inwardly bending action of the blasts from the said air-ducts while the plunger is seated on the blank, and means for bending inwardly the leading side end flaps of the blank during the continued travel of the conveyer, said last-named means initially supporting such leading end flaps in opposition to the air pressure.

15. A tray making machine comprising a former conveyer embodying a succession of tray die-members, each having in one side thereof adjacent its respective ends air-ducts to discharge across the upper face of the die-member, and embodying also complementary reciprocative former plungers for said die-members, means for continuously moving said conveyer, means for feeding to the succeeding travelling die-members tray-blanks having bendable end flaps, means for independently reciprocating the former plungers with short and extended downward strokes at stated intervals during the travel of the conveyer, each plunger in its short stroke depressing the blank in the die-member to bend up the side flaps of the blank and thereby present the end flaps of the trailing side portion of the blank to the inwardly bending action of the blasts from the said air-ducts while the plunger is seated on the blank, and each plunger in its extended stroke farther depressing the blank to bend up the bottom end flaps thereof, and means for supporting the end flaps of the leading side portion of the blank in opposition to the air pressure, and for bending them inwardly preparatory to the extended downward movement of the plunger and the blank in the die-member.

16. A tray making machine comprising a former conveyer embodying a succession of tray die-members, each having in one side thereof adjacent its respective ends air-ducts to discharge across the upper face of the die-member, and embodying also complementary reciprocative former plungers for said die-members, means for continuously moving said conveyer, means for feeding to the succeeding travelling die-members tray blanks having bendable end flaps, means for independently reciprocating the former plungers at stated intervals during the travel of the conveyer with short and extended downward strokes and then with long upward and downward strokes, each plunger in its short stroke depressing the blank in the die member to bend up the side portions of the blank and thereby present the end flaps of the trailing side portion of the blank to the inwardly bending action of the blasts from the said air-ducts while the plunger is seated on the blank, and the extended stroke of the plunger farther depressing the blank to bend up the bottom end flaps thereof with their free ends extends above the previously bent end flaps, and means for supporting the end flaps of the leading side portion of the blank in opposition to the air pressure, then bending inwardly the leading side flaps preparatory to the extended downward movement of the plunger and the blank in the die-member, and then upon the long upward stroke of the plunger bending the extensions of the bottom end flaps inwardly of the tray body and in the path of said plunger in its next succeeding long down stroke.

17. In a tray making machine a former conveyer embodying a succession of die-members for the reception of tray blanks having lateral end flaps, each of said members having in one side thereof adjacent its respective ends air-ducts to discharge across the upper face of the die-member and against the end flaps of the blank seated thereon, former plungers cooperating with said die-members, means for reciprocating said plungers, and a support for the conveyer having air channels with which the said air-ducts register during the travel of the conveyer.

18. A tray making machine having a former conveyor comprising an endless chain of links mounted to travel in an elongated horizontal path, each link having a vertical guide member and a horizontal die-member, said die-member having a tray-matrix extending vertically therethrough, complementary former plungers slidably mounted in the guide members in cooperative relation to the respective die-members, means for continuously moving said conveyer, means for vertically reciprocating said former plungers at stated intervals during the travel of the conveyer, and guides for the longitudinal runs of the conveyer comprising stationary base bars which afford bottoms for the matrices of the die-members during the major portion of the travel of the conveyer.

MICHAEL PARIDON.